Patented Apr. 15, 1947

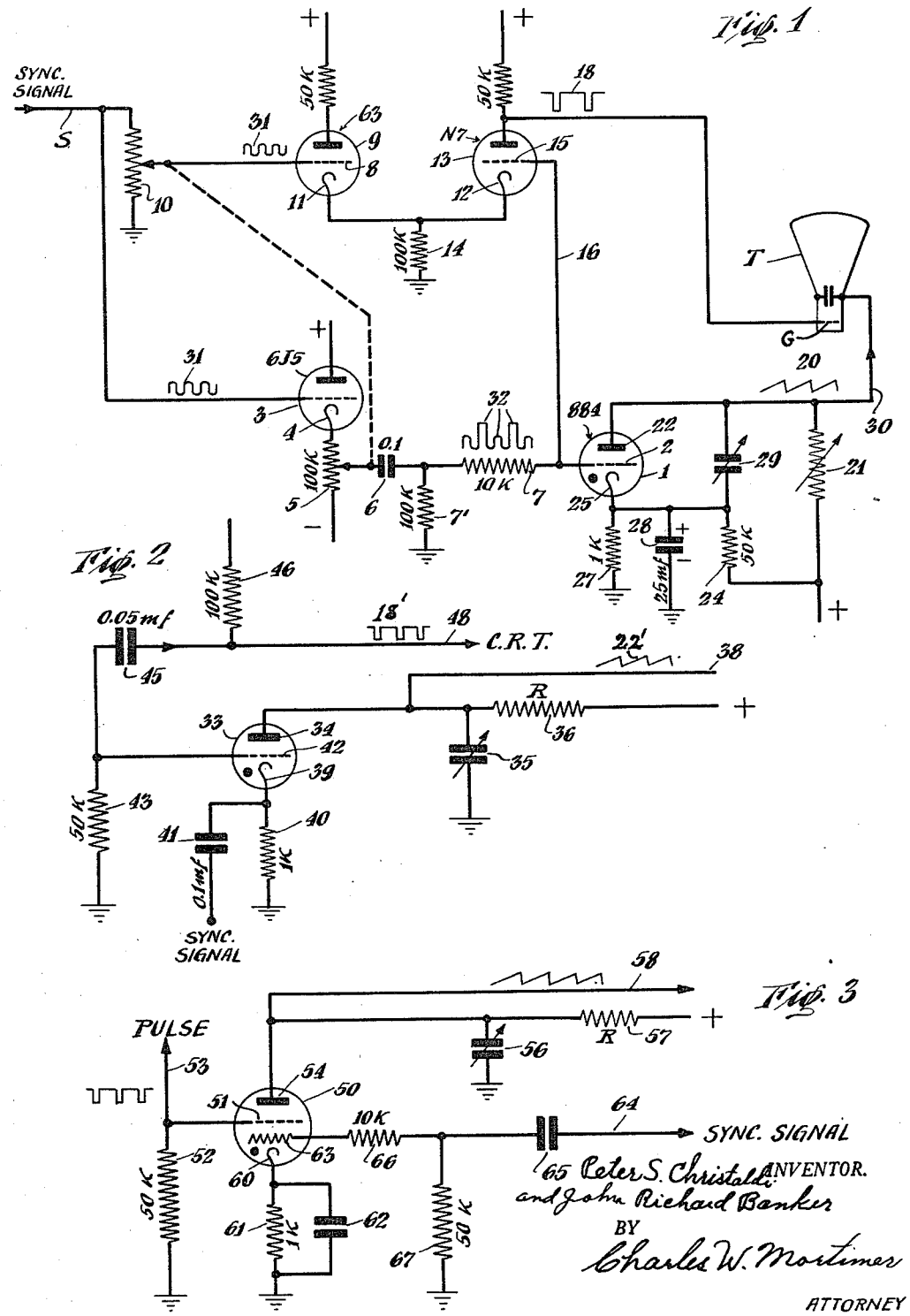

2,419,118

UNITED STATES PATENT OFFICE 2,419,118

SWEEP SYNCHRONIZING AND BEAM BLANKING DEVICE

Peter S. Christaldi, Upper Montclair, and John Richard Banker, Passaic, N. J., assignors to Allen B. Du Mont Laboratories, Inc., Passaic, N. J., a corporation of Delaware Application January 21, 1943, Serial No. 473,060

7 Claims. (Cl. 315—22)

This invention relates to a sweep synchronizing and beam blanking device in which electrical circuits are provided by means of which signals of a desired sort can be generated at a selected point in a circuit to which another signal is being fed, without interference because of the second signal.

The invention will be described particularly in connection with its application to a cathode-ray tube grid for blanking purposes although it is not restricted to this particular use. With this invention a blanking signal pulse wave can be utilized from across the grid resistor of a gas filled triode time-base oscillator. At the same time spurious intensity modulation occurring because of the simultaneous application of a synchronizing signal to the same grid resistor is prevented.

The invention may be understood from the description in connection with the accompanying drawings, in which:

Fig. 1 is a diagram of connections showing one embodiment of the invention; and

Figs. 2 and 3 are modifications.

In Fig. 1 reference character 1 indicates a gas triode or sawtooth oscillator to the grid of which a synchronizing signal is applied. This signal may, for example, be a sine wave from any convenient source, as indicated at S, which is passed through the impedance transformer triode 3, having its cathode 4 connected through resistor 5 to ground. It is coupled through capacitor 6 and resistor 7 to the grid 2 which is provided with grid leak 7'.

At the same time, the signal S is applied to the grid 8 of vacuum tube 9 through an attenuator resistor 10. The contacts on resistors 5 and 10 are ganged as shown by the dotted line so that they control the amounts of signals that are applied to the grids of tubes 3, 9 and N7. The cathode 11 of tube 9 is connected to cathode 12 of vacuum tube 13 and the two are grounded through resistor 14. The grid 15 of tube 13 is connected by lead 16 to grid 2 of tube 1. The output 18 from tube 13 is in the form of blanking pulses which may be applied to the grid of a cathode-ray tube for blanking the beam during intervals of return trace.

A resistor 24 is connected between the positive supply of potential and cathode 25 of tube 1 which has a bias resistor 27 connected to ground and by-passed by a capacitor 28. A variable capacitor 29 is connected between plate 22 and cathode 25. This sweep circuit capacitor 29 is charged through resistor 21 and discharged by tube 1 to produce the sawtooth wave form 20 which is applied by means of lead 30 to the deflection circuit of a cathode-ray tube T illustrated diagrammatically. The blanking signal 18 is applied to the grid G of this tube.

In Fig. 2 reference character 33 indicates a gas triode having plate 34 which is shunted to ground by variable capacitor 35. Capacitor 35 is charged through resistor 36 and tube 33 discharges capacitor 35 to produce a sawtooth wave form 22' which is delivered by lead 38 to the deflection circuit of a cathode-ray tube. The cathode 39 of tube 33 is connected to ground through resistor 40, and a synchronizing signal from any desired source is applied to this cathode 39 by means of capacitor 41. Grid 42 is provided with grid leak 43 across which is generated a return trace blanking signal which is coupled through capacitor 45 and across resistor 46 to the grid of a cathode-ray tube or oscillograph by means of lead 48, after being amplified when needed.

In the modification shown in Fig. 3, the gas discharge tube 50 is provided with an additional element 51 upon which the blanking pulse may be generated across resistor 52 and delivered by means of lead 53 to cathode-ray tube grid amplifier as indicated above. In this embodiment, plate 54 is connected in the normal way to a variable capacitor 56 which is charged through resistor 57 from a source of positive potential and is discharged by tube 50 to produce a sawtooth wave form which is connected by means of lead 58 to the deflection circuit as explained above. The cathode 60 of tube 50 is connected to ground through resistor 61 which is by-passed by capacitor 62. Grid 63 is provided with synchronizing signals through lead 64 from any suitable source and through capacitor 65 and resistor 66 with grid leak 67 to ground.

The values shown on the drawing are illustrative.

The operation is as follows: In Fig. 1 a synchronizing signal which may be in the form of a sine wave 31 is applied to the grids of the tubes 3 and 9. The amplitude of the signal from tube 3 can be controlled by the variable position of the contactor on resistor 5. At the same time, this wave 31 is applied to tube 9 and thence to cathode 12 so that this signal and the sine wave component of signal from cathode 4 are in phase and are regulated in amplitude by potentiometers 5 and 10 so that they are balanced out by grid 15 and cathode 12, so that no plate signal at tube 13 is generated by signal S.

The positive potential applied to the plate 22 of the gas triode oscillator 1 generates the sawtooth wave 20 because this positive potential charges capacitor 29 sufficiently high to enable the sync. signal S potential applied by sine wave voltage from tube 3 to fire this triode 1 at desired frequencies. This firing is regulated by the time constants of the variable resistor 21 and variable capacitor 29 and by the amplitude and frequency of wave 31.

During firing periods of triode 1, increased potential is applied to the grid 2 of tube 1 as indicated by the rectangularly shaped impulses of wave 32. The wave 32 is applied by lead 16 to the grid 15 of tube 13. The sine wave component of this wave is balanced out, as explained above, and the rectangular component appears in reversed polarity as shown at 18 and constitutes the blanking pulse 18 for the grid G".

In Fig. 2 the synchronizing voltage is applied in the cathode circuit through capacitor 41, leaving the grid 42 free of all synchronizing voltage and thus the grid 42 is available for direct generation of the blanking signals which will generate across resistor 40. These blanking signals are generated by means of the grid 42 assuming a potential due to space charge during the gaseous ionization cycle of tube 33. This grid impulse 18', shaped like wave form 18 of Fig. 1 but of whatever polarity the number of stages of amplification will provide, has a duration equal to the duration of the gaseous discharge in tube 33 (Fig. 2) or tube 2 (Fig. 1) or tube 50 (Fig. 3). Accordingly, such an impulse voltage is quite suitable for application to the grid amplifier of the cathode-ray oscillograph to turn off the electron beam during the return trace time of the conventional sawtooth time base deflecting signals.

In Fig. 3 a gas discharge tube 50 is shown in which an additional grid 51 is employed to generate the desired blanking pulses, thus leaving the normal grid 63 available for the conventional synchronizing use. This has proven to be extraordinarily satisfactory as a means of synchronization from high impedance circuits. Figs. 2 and 3 show means of synchronization so as to avoid the mixing of the synchronizing signals with the blanking signals, and thus they do not require the separation of these two signals as was the case in Fig. 1.

While the disclosures here given have pointed out specific uses in connection with the blanking of a cathode-ray tube in an oscillograph, it is to be understood that these circuits are extremely suitable for providing impulse signals accurately controlled by synchronizing signals from any appropriate source but that they can also be used in other applications where it is desired to discriminate between components of a signal existing at a point in a circuit but arising from different sources.

Previous circuits to provide grid blanking for return trace elimination have utilized differentiating circuits which by frequency discrimination produce blanking signals under very rapid portions of the steep slope of the sawtooth return voltages. However, the circuits herein described produce grid blanking impulses which are independent of the absolute frequency of deflection over a very wide range and are thus far more satisfactory.

What is claimed is:

1. A sweep synchronizing and beam blanking device for a cathode-ray tube having a deflection circuit which comprises a gas filled tube having a plate, a grid and a cathode, means to connect a synchronizing signal to said grid, a circuit connected to said plate adapted to generate a saw-tooth wave, means to connect said saw-tooth wave to the deflection circuit of said cathode-ray tube, and means to couple the grid of said gas filled tube to the grid of said cathode-ray tube for blanking the beam of said cathode-ray tube during its return period.

2. The device of claim 1 in which a resistor is located between said gas filled tube grid and ground.

3. The device of claim 1 in which said sawtooth wave generating circuit is provided with an adjustable timing element.

4. The device of claim 1 in which said gas filled tube is provided with means for isolating said synchronizing signal from the grid of said cathode-ray tube.

5. The device of claim 1 in which another grid is provided in said gas filled tube instead of said first named grid for applying blanking pulses to said gas filled tube, said other grid being connected to ground through a resistor.

6. A sweep synchronizing and beam blanking device for a cathode-ray tube which comprises a gas filled tube having a plate, a grid and a cathode, a circuit connected to said plate adapted to generate a sawtooth wave, means for coupling a synchronizing signal to the grid of said gas filled tube comprising an amplifier and an impedance connecting said amplifier to the grid of said gas filled tube, means for selectively applying to the grid of said cathode-ray tube a signal generated in said gas filled tube and appearing on its grid without applying to the grid of said cathode-ray tube the synchronizing signal that was applied to the grid of said gas filled tube.

7. The device of claim 6 in which said last named means comprises a differential amplifier having two input circuits and an output circuit, one of said input circuits having applied thereto a synchronizing signal identical in all respects to that applied to the grid of said gas filled tube, the other of said input circuits having applied thereto the composite signal appearing at the grid of said gas filled tube comprising said synchronizing signal and a beam blanking signal obtained from the grid of said gas filled tube during the return interval of said sawtooth wave, means for connecting the grid of said cathode-ray tube to the output circuit of said differential amplifier, whereby only the beam blanking signal generated at the grid of said gas filled tube reaches the grid of said cathode-ray tube.

PETER S. CHRISTALDI.
JOHN RICHARD BANKER.

REFERENCES CITED

The following references are of record in the file of this patent:

UNITED STATES PATENTS

| Number | Name | Date |
|---|---|---|
| 2,246,283 | Zworykin | June 17, 1941 |
| 2,285,043 | Messner | June 2, 1942 |
| 2,303,924 | Faudell | Dec. 1, 1942 |
| 1,933,219 | Nakajima et al. | Oct. 31, 1933 |
| 2,059,004 | Leeds | Oct. 27, 1936 |
| 2,222,943 | George | Nov. 26, 1940 |
| 2,264,781 | Wheeler | Dec. 2, 1941 |
| 2,265,780 | Schlesinger | Dec. 9, 1941 |

OTHER REFERENCES

Ser. No. 90,702, W. Federmann (A. P. C.) pub. May 25, 1943.